United States Patent
Wang et al.

(10) Patent No.: US 7,616,656 B2
(45) Date of Patent: Nov. 10, 2009

(54) SYSTEM AND METHOD FOR PROVIDING COMMUNICATION BETWEEN INTELLIGENT ELECTRONIC DEVICES VIA AN OPEN CHANNEL

(75) Inventors: Wei Wang, Bronx, NY (US); Fred Slota, Coram, NY (US)

(73) Assignee: Electron Industries / Gauge Tech, Westbury, NY (US)

( * ) Notice: Subject to any disclaimer, the term of this patent is extended or adjusted under 35 U.S.C. 154(b) by 563 days.

(21) Appl. No.: 10/969,592

(22) Filed: Oct. 20, 2004

(65) Prior Publication Data

US 2006/0083260 A1    Apr. 20, 2006

(51) Int. Cl.
H04L 12/66   (2006.01)
H04J 3/16    (2006.01)
H04J 3/22    (2006.01)
G05D 3/12    (2006.01)
G01R 21/00   (2006.01)
G01R 21/06   (2006.01)

(52) U.S. Cl. .................. 370/463; 370/466; 370/467; 700/295; 702/62

(58) Field of Classification Search .......... 370/463, 370/466, 467; 700/295; 702/62
See application file for complete search history.

(56) References Cited

U.S. PATENT DOCUMENTS

| | | |
|---|---|---|
| 5,650,936 A | 7/1997 | Loucks et al. |
| 5,736,847 A | 4/1998 | Van Doorn et al. |
| 5,828,576 A | 10/1998 | Loucks et al. |
| 5,995,911 A | 11/1999 | Hart |
| 6,000,034 A | 12/1999 | Lightbody et al. |
| D427,533 S | 7/2000 | Cowan et al. |
| D429,655 S | 8/2000 | Cowan et al. |
| D435,471 S | 12/2000 | Simbeck et al. |
| 6,185,508 B1 | 2/2001 | Van Doorn et al. |
| 6,186,842 B1 | 2/2001 | Hirschbold et al. |
| D439,535 S | 3/2001 | Cowan et al. |
| 6,236,949 B1 | 5/2001 | Hart |
| D443,541 S | 6/2001 | Hancock et al. |
| 6,397,155 B1 | 5/2002 | Przydatek et al. |
| D458,863 S | 6/2002 | Harding et al. |
| D459,259 S | 6/2002 | Harding et al. |
| 6,493,644 B1 | 12/2002 | Jonker et al. |

(Continued)

OTHER PUBLICATIONS

Xu Hong, Wang Jianhua, "An Extendable Data Engine based on OPC Spcification"; Computer Standards & Interfaecs 26 (2004) 515-525; Dec. 5, 2003.

*Primary Examiner*—Chi H Pham
*Assistant Examiner*—Farah Faroul
(74) *Attorney, Agent, or Firm*—Gerald E. Hespos; Anthony J. Casella; Michael J. Porco

(57) ABSTRACT

An intelligent electronic device is configured to receive and generate data formatted in accordance with Distributed Network Protocol 3.0 (DNP 3.0) through an Ethernet TCP/IP medium. The intelligent electronic metering device for communicating over a network via an open channel includes an adapter to couple the electronic metering device to the network and to receive a message in a protocol of the network, wherein the adapter formats the message in a serial protocol; and a processor to receive the message from the adapter, generate a response to the message and transit the response to the adapter, wherein the adapter formats the response in the protocol of the network and transmits the response over the network via an open channel.

18 Claims, 4 Drawing Sheets

U.S. PATENT DOCUMENTS

| | | |
|---|---|---|
| 6,563,697 B1 | 5/2003 | Simback et al. |
| 6,611,773 B2 | 8/2003 | Przydatek et al. |
| 6,611,922 B2 | 8/2003 | Ozcetin et al. |
| 6,615,147 B1 | 9/2003 | Jonker et al. |
| 6,636,030 B1 | 10/2003 | Rose et al. |
| 6,671,635 B1 | 12/2003 | Forth et al. |
| 6,671,654 B1 | 12/2003 | Forth et al. |
| 6,687,627 B1 | 2/2004 | Gunn et al. |
| 6,694,270 B2 | 2/2004 | Hart |
| 6,735,535 B1 | 5/2004 | Kagan et al. |
| 6,737,855 B2 | 5/2004 | Huber et al. |
| 6,745,138 B2 | 6/2004 | Przydatek et al. |
| 6,751,562 B1 | 6/2004 | Blackett et al. |
| 6,751,563 B2 | 6/2004 | Spanier et al. |
| 6,792,337 B2 | 9/2004 | Blackett et al. |
| 6,792,364 B2 | 9/2004 | Jonker et al. |
| 6,798,190 B2 | 9/2004 | Harding et al. |
| 6,798,191 B1 | 9/2004 | Macfarlane et al. |
| 6,813,571 B2 | 11/2004 | Lightbody et al. |
| 6,825,776 B2 | 11/2004 | Lightbody et al. |
| 6,853,978 B2 | 2/2005 | Forth et al. |
| 6,871,150 B2 | 3/2005 | Huber et al. |
| D505,087 S | 5/2005 | Ricci et al. |
| 6,944,555 B2 | 9/2005 | Blackett et al. |
| 6,957,158 B1 | 10/2005 | Hancock et al. |
| 6,961,641 B1 | 11/2005 | Forth et al. |
| 6,983,211 B2 | 1/2006 | Macfarlene et al. |
| 6,988,025 B2 | 1/2006 | Ransom et al. |
| 6,988,182 B2 | 1/2006 | Teachman et al. |
| 6,990,395 B2 | 1/2006 | Ransom et al. |
| 7,006,934 B2 | 2/2006 | Jonker et al. |
| 7,010,438 B2 | 3/2006 | Hancock et al. |
| 7,072,779 B2 | 7/2006 | Hancock et al. |
| 7,085,824 B2 | 8/2006 | Forth et al. |
| 7,089,089 B2 | 8/2006 | Cumming et al. |
| 7,127,328 B2 | 10/2006 | Ransom |
| D532,747 S | 11/2006 | Ricci et al. |
| 7,136,384 B1 * | 11/2006 | Wang ................... 370/395.1 |
| D534,120 S | 12/2006 | Ricci et al. |
| 7,155,350 B2 | 12/2006 | Kagan |
| 7,158,050 B2 | 1/2007 | Lightbody et al. |
| 7,174,258 B2 | 2/2007 | Hart |
| 7,174,261 B2 | 2/2007 | Gunn et al. |
| 7,256,709 B2 | 8/2007 | Kagan |
| 7,294,997 B2 | 11/2007 | Kagan |
| 7,304,586 B2 | 12/2007 | Wang et al. |
| 2002/0114326 A1 | 8/2002 | Mahalingaiah |
| 2002/0162014 A1 | 10/2002 | Przydatek et al. |
| 2002/0165677 A1 | 11/2002 | Lightbody et al. |
| 2003/0014200 A1 | 1/2003 | Jonker et al. |
| 2003/0065459 A1 | 4/2003 | Huber et al. |
| 2003/0101008 A1 | 5/2003 | Hart |
| 2003/0105608 A1 | 6/2003 | Hart |
| 2003/0132742 A1 | 7/2003 | Harding et al. |
| 2003/0154471 A1 | 8/2003 | Teachman et al. |
| 2003/0210699 A1 * | 11/2003 | Holt et al. ................... 370/400 |
| 2003/0212512 A1 | 11/2003 | Hart |
| 2003/0220752 A1 | 11/2003 | Hart |
| 2004/0066311 A1 | 4/2004 | Giles et al. |
| 2004/0138786 A1 * | 7/2004 | Blackett et al. ............. 700/295 |
| 2004/0138787 A1 | 7/2004 | Ransom et al. |
| 2004/0138835 A1 | 7/2004 | Ransom et al. |
| 2004/0172207 A1 | 9/2004 | Hancock et al. |
| 2004/0183522 A1 | 9/2004 | Gunn et al. |
| 2004/0229578 A1 | 11/2004 | Lightbody et al. |
| 2005/0017874 A1 | 1/2005 | Lightbody et al. |
| 2005/0027464 A1 | 2/2005 | Jonker et al. |
| 2005/0071106 A1 | 3/2005 | Huber et al. |
| 2005/0275397 A1 | 12/2005 | Lightbody et al. |
| 2005/0288876 A1 | 12/2005 | Doig et al. |
| 2005/0288877 A1 | 12/2005 | Doig et al. |
| 2006/0052958 A1 | 3/2006 | Hancock et al. |
| 2006/0071813 A1 | 4/2006 | Kagan |
| 2006/0077999 A1 * | 4/2006 | Kagan et al. ................ 370/466 |
| 2006/0170409 A1 | 8/2006 | Kagan et al. |
| 2006/0187956 A1 * | 8/2006 | Doviak et al. ............... 370/466 |
| 2006/0230394 A1 | 10/2006 | Forth et al. |
| 2006/0271244 A1 | 11/2006 | Cumming et al. |

* cited by examiner

SYSTEM AND METHOD FOR PROVIDING COMMUNICATION BETWEEN INTELLIGENT ELECTRONIC DEVICES VIA AN OPEN CHANNEL

BACKGROUND OF THE INVENTION

1. Field of the Invention

The present invention relates generally to the monitoring and control of metering systems. More particularly, the present invention relates to an intelligent electronic device configured to generate a serial message using a DNP protocol and to transmit this message via an Ethernet medium.

2. Discussion of the Related Prior Art

The metering architecture that exists in the power utility field today is geared toward providing enough information to accurately monitor and control a variety of metering devices installed at numerous substations. To achieve these objectives, it is essential that communication between a central utility station and substations be time-and cost-efficient, quick updating, as well as reliable.

Historically, meters measuring electrical energy have used measurement devices, which mechanically monitor the subscriber's usage and display a reading of the usage at the meter itself. Consequently, the reading of these meters has required that human meter readers physically go to the site of the meter and manually document the readings. Clearly, this approach relies very heavily on human intervention and, thus, is very costly, time-consuming, and prone to human error. As the number of meters in a typical utility's service region has increased, in some cases into the millions, human meter reading has become prohibitive in terms of time and money.

Over time, these conventional meters were made using microprocessor technologies, which enabled them to be read using a serial protocol and interface. This enabled the meters to be used in series to obtain readings back at a remote terminal unit (RTU) for remote SCADA (Supervisory Control and Data Acquisition) interrogation. For example, FIG. 1 is a schematic view of a conventional system for monitoring and controlling a plurality of substations. That is, referring to FIG. 1, meters 1, 2, and 3 can communicate serially through each other. However, in order for a SCADA master 5 to receive information from meter 3, the information must be passed from meter 3 to meter 2, from meter 2 to meter 1, from meter 1 to an RTU 4, and from the RTU 4 to the SCADA master 5.

Realization of such communication may be accomplished by a standard open protocol known as DNP 3.0. This protocol is configured to provide the power utility with a serial language to speak to the substations and to allow the utility to use outage detection software, generically labeled in the industry as SCADA. In other words, communication between each of the meters and, for example, a central station is realized through a respective serial port and is thus limited to a respective pair coupled to one another via a dedicated channel.

Originally the SCADA systems have been provided with generally UNIX-based software operative to establish communication only between RTUs, which originally were embedded devices operative to bring in analog inputs and provide digital outputs. Accordingly, all analog telemetry was brought to the RTU and then converted to a digital signal subsequently formatted and transferred to the SCADA master. With the advent of digital communication technology, a variety of intelligent electronic devices (IED) including, but not limited to, metering, protective relays, apparatus equipment, and controllers, have become operative to communicate a digital serial protocol though a plurality of dedicated channels.

One disadvantage of this approach may have been that when a number of meters transmit meter data nearly simultaneously, the inherent latency on the area network including a plurality of dedicated serial channel or dedicated cables results in packet collisions, lost data, garbled data, and general degradation of integrity across the system. To compensate for the collisions and interference between data packages destined for the central computer, due to the latency inherent in this system, various management schemes have been employed to ensure reliable delivery of the meter data. However, while this approach may be suitable for small systems, it does not serve the needs of a utility monitoring thousands or even millions of meters.

Therefore, a need exists to provide a system whereby a utility company can reliably and rapidly read on the order of innumerous meters in the absence of any significant human intervention. Further, a need exists to provide a system configured with multiple IED devices that are capable of communicating via Ethernet TCP/IP by using the DNP 3.0 protocol through an open socket within the Ethernet TCP/IP medium.

SUMMARY OF THE INVENTION

The above and other objectives are attained by a metering apparatus and system for monitoring and controlling a plurality of metering devices in the field of energy use/control through the ability of individual metering apparatus capable of generating DNP 3.0 serial data and transmit this data through an open socket via Ethernet TCP/IP.

In accordance with one aspect of the invention, a metering device is configured with an IED COM processor, operative to perform multiple tasks, and an IED Network Adapter or card built in the metering device and coupled to the processor. The card is configured to format and send data from the processor using DNP 3.0 protocol via an open socket into Ethernet TCP/IP.

According to a further aspect of the invention, a plurality of substations, each of which is provided with at least one inventive metering device, are coupled together in a system capable of transmitting the data from each substation to either the RTU and further to the SCADA master or directly to the latter without using a dedicated serial cable or channel.

Still a further aspect of the invention is concerned with a system configured to provide communication between a local area network including a plurality of the inventive devices and the Internet.

The present invention, therefore, concerns the compatibility between the existing network of intelligent electronic devices (IED) operating in accordance with the DNP 3.0 protocol via an Ethernet TCP/IP. Briefly, the invention teaches that the aforementioned compatibility may be achieved by embedding the adapter recognizing the DNP 3.0 protocol in each individual IED device to provide communication between this device or substation and any other device, which is the member of the network, via non-dedicated channels.

BRIEF DESCRIPTION OF THE DRAWINGS

The above and other objects, features, and advantages will become more readily apparent from the detailed description of the invention accompanied by the following drawings, in which.

DETAILED DESCRIPTION OF THE INVENTION

Figure 1:
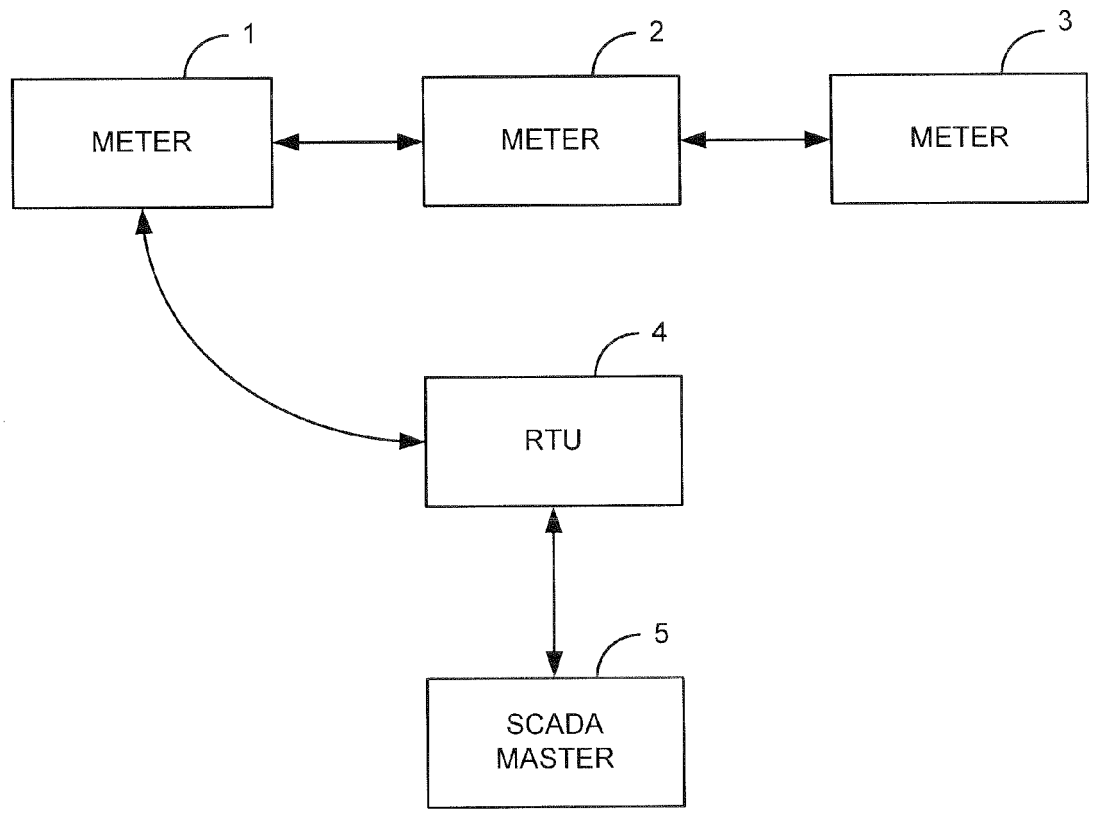
FIG. 1 is a schematic view of a conventional system for monitoring and controlling a plurality of substations.
Figure 2:
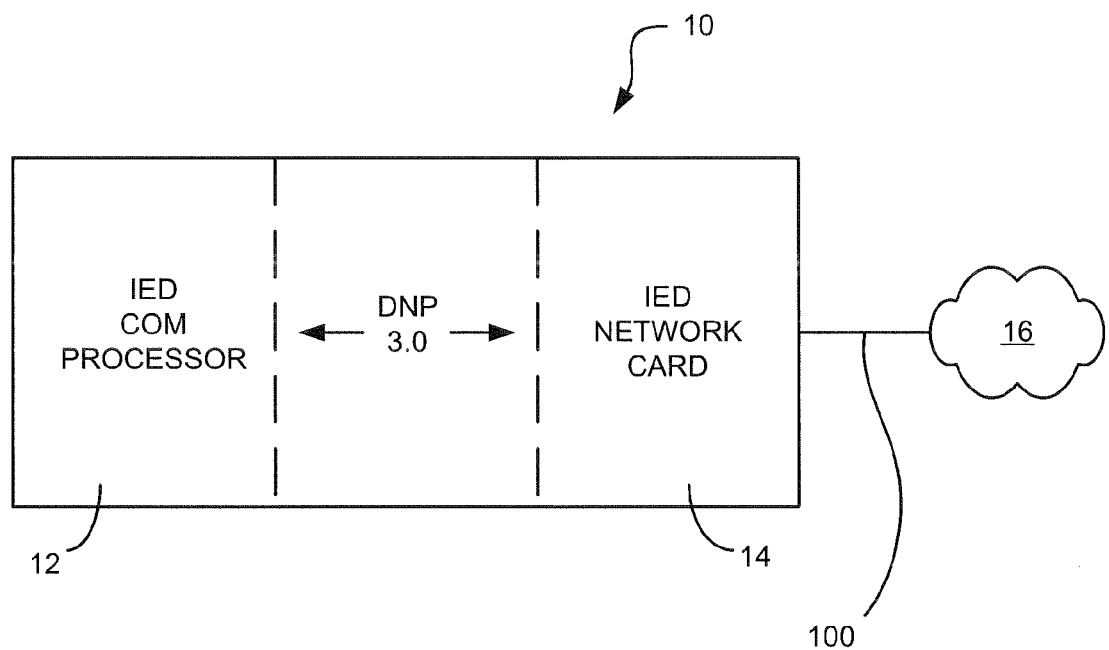
FIG. 2 is a schematic view of a metering device configured in accordance with the invention.
Figure 3:
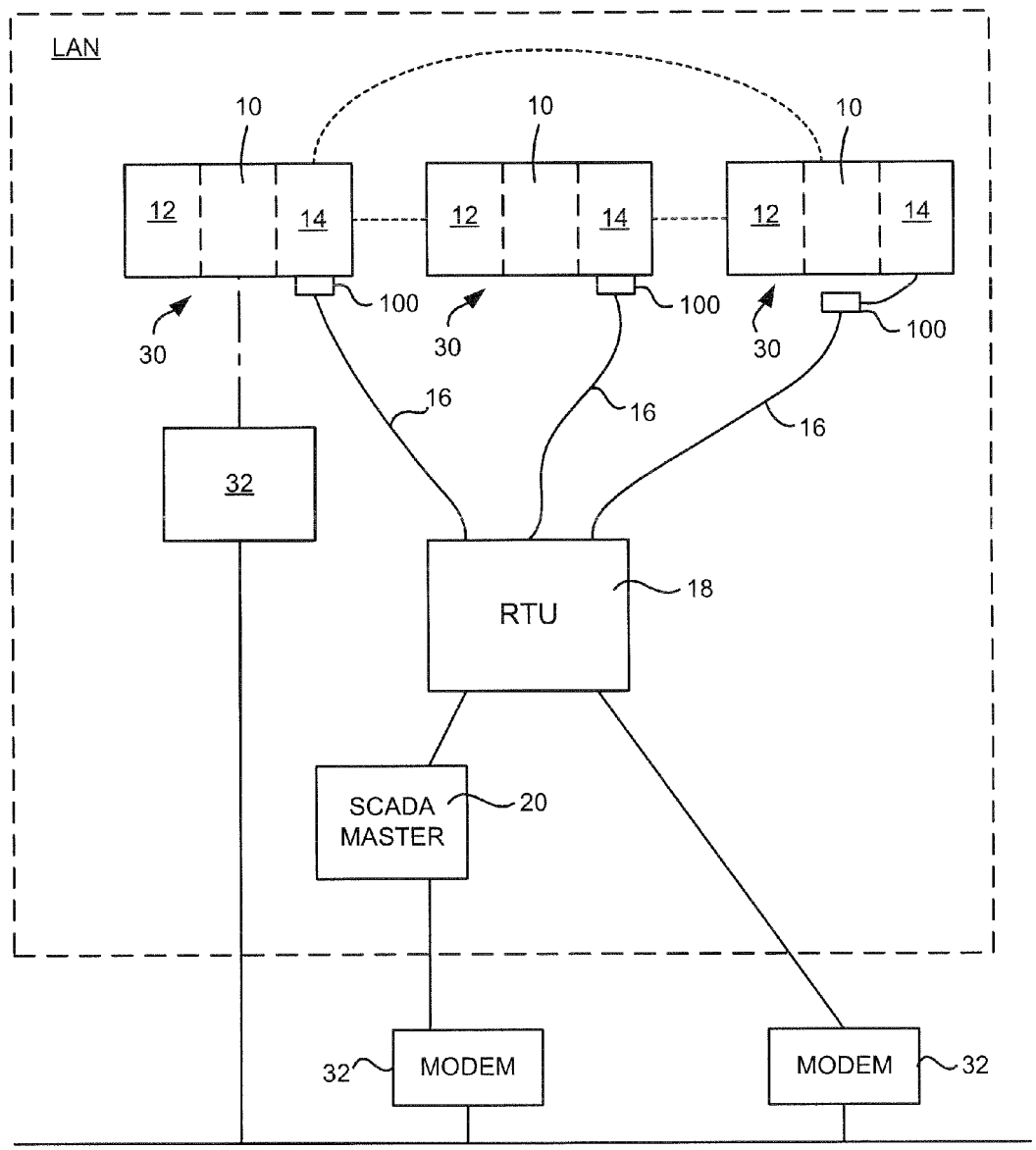
FIG. 3 is a schematic view of a system for monitoring and controlling a plurality of substations each provided with at least one inventive metering device of FIG. 2.

Referring to FIGS. 2 and 3, a metering device 10 is configured as an intelligent electronic metering device (IEMD). Functions of the IEMD 10 may include voltage transformation, regulation and control, power-factor (e.g., capacitor-bank) and load balancing, monitoring, protection of hardware, etc.

The IEMD 10 includes an IED COM processor 12 (FIG. 2) and a built-in IED Network Card 14 coupled to the processor 12 and operative to receive and transmit data between the IEMD 10 and a remote unit through an open socket 100 within an Ethernet TCP/IP medium 16 (FIGS. 2 and 3). Unlike a conventional IEMD communicating with a remote terminal unit (RTU) or SCADA master via a dedicated channel, the card 14 adapts a serial message from or to the processor 12 using the DNP 3.0 so as to receive and transmit the message via the Ethernet medium 16.

As illustrated in FIG. 2, the card 14 strips a message from the open socket 100 channel within the Ethernet and sends it through a serial message or command to processor 12 in accordance with the prescribed DNP 3.0 protocol. In return, the processor 12 generates a serial response, including for example, a measurement requested by the SCADA, and adapted by the card 14 for sending this response via the Ethernet medium.

More specifically, the card 14 recognizes DNP by identifying an Internet Protocol (TCP, UDP, etc.). After retrieving the DNP data, the card 14 sends this data to the processor 12 over a serial channel. For this serial communication, the card 14 and the processor 12 use a predetermined protocol for faster data transfer. The predetermined protocol is only used internally between the card 14 and the processor 12. Accordingly, this protocol has its own headers and footers.

In the protocol, the DNP response is transferred to the card 14 through the serial message. When the card 14 receives this message, the DNP response is prepared with TCP/IP Header for Ethernet medium. A flow diagram illustrating this procedure is illustrated in FIG. 4.

Figure 4:
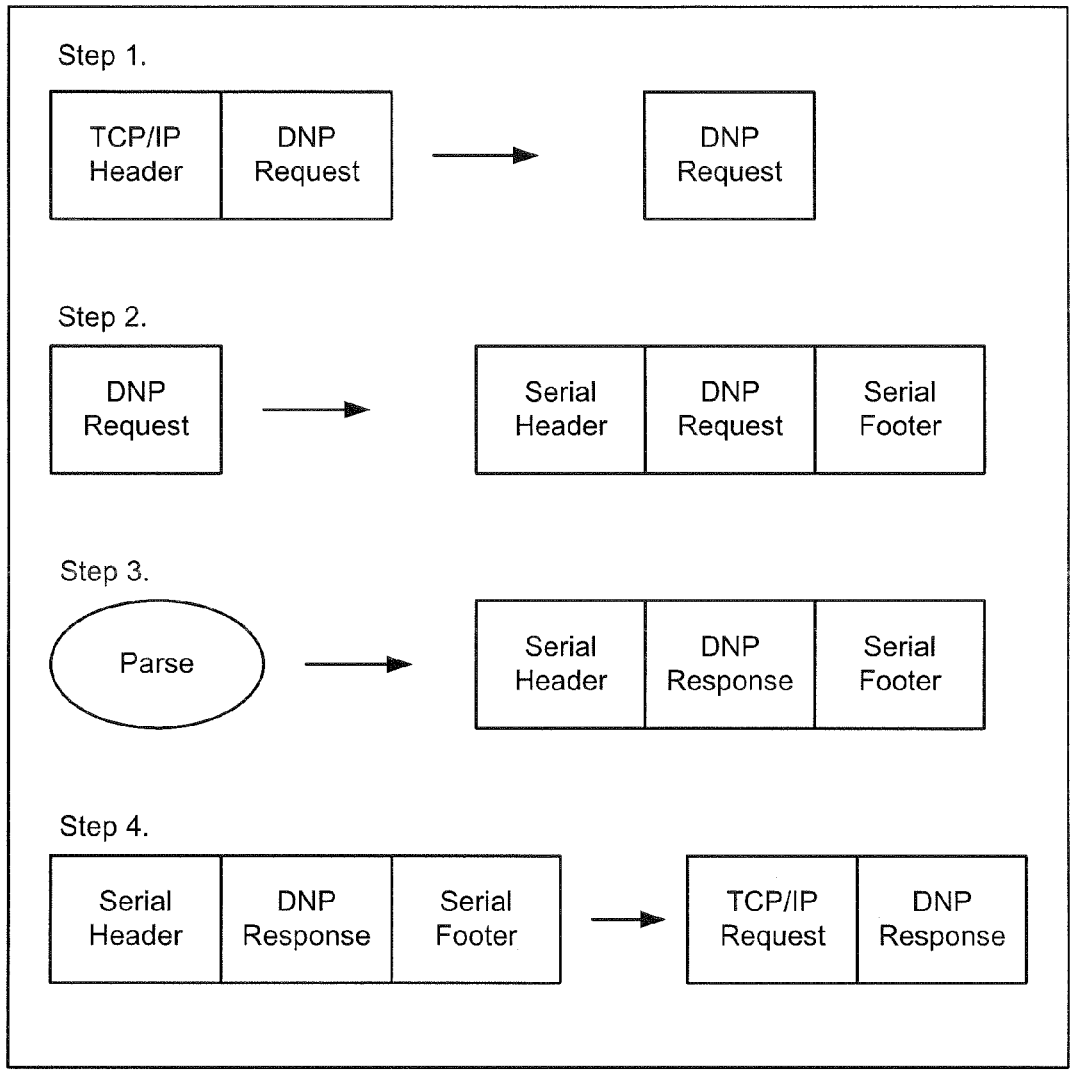
FIG. 4 is a flow diagram illustrating a method of using DNP according to an embodiment of the present invention.

Referring to FIG. 4, in Step 1 the card 14 recognizes the data by TCP/IP Header and Footer from the Network and strips the Header and Footer. In Step 2, the card 14 builds another Header and Footer for serial communication and transmits DNP Request to the processor 12 of the unit. In step 3, the processor 12 parses the DNP Request and a DNP response is generated. This DNP response is sent out to the card 14. Thereafter, in Step 4, the card 14 receives this DNP Response and builds TCP/IP Header and Footer. This DNP Response is sent out to the Network.

Accordingly, utilizing the inventive IEMD device, which is provided with the card 14, allows the generated data to be transmitted over the LAN to either the RTU 18 (FIG. 3) or to the SCADA master 20 itself, not through a dedicated serial cable, but through the open socket 100 within the Ethernet TCP/IP medium.

Accordingly, the inventive device 10 provides significantly higher speed outputs and eliminates the need for dedicated serial channels or dedicated wiring. Further, using the TCP/IP technology enables the metering devices to communicate, and also enables them to simultaneously communicate through more than one channel. As a result, readings can be brought back to the SCADA while other software packages can be used to interrogate the metering devices for other purposes, e.g., remote fault interrogation.

In accordance with a further embodiment of the invention, the inventive device 10 enables the power Utility to transmit the data via the Internet. As illustrated in FIG. 3, each device 10, defining a respective substation 30, may be directly connected to the Internet medium 16 by a coupler including a cable modem or DSL 32 (FIG. 3). Alternatively or in addition, multiple stations each including the inventive device 10 may be connected to the RTU 18 via the Ethernet medium 16 and to the SCADA master 20 via the Internet medium 16. This provides faster, more reliable communication at a much lower cost since dedicated telephone lines, radio, or other similar infrastructure does not need to be in place. Additionally, the present invention provides much more connectivity between devices, enables simultaneous updates from the entire system, and provides increased efficiency as no serial daisy chains are used.

While the present invention has been shown and described with reference to a certain preferred embodiment thereof, it will be understood by those skilled in the art that various changes in form and details may be made therein without departing from the spirit and scope of the present invention.

What is claimed is:

1. An intelligent electronic metering device for communicating over a network via an open channel, the device comprising:

an adapter to couple the electronic metering device to the network and to receive a message in a protocol of the network, the message including a request formatted in at least one metering communication protocol, wherein the adapter formats the request in a serial protocol of the electronic metering device by stripping a network protocol header and footer from the message in the protocol of the network and building a serial header and footer of the serial protocol around the request without changing the request, the protocol of the network being different than the serial protocol;

a serial channel coupling the adapter to a processor; and the processor to receive the request from the adapter through the serial channel after the adapter formats the request in the serial protocol, generate a response to the request and transmit the response to the adapter via the serial protocol of the electronic metering device, wherein the adapter formats the response in the protocol of the network by building a network protocol header and footer around the response without changing the response and transmits the response with the network protocol header and footer over the network via an open channel.

2. The device as in claim 1, wherein the request and response are in accordance with the Distributed Network Protocol 3.0 (DNP 3.0).

3. The device as in claim 1, wherein the adapter is an Ethernet card.

4. The device as in claim 1, wherein the protocol of the network is TCP/IP.

5. The device as in claim 4, wherein the adapter strips a TCP/IP header and footer from the received message and builds a serial header and footer around the request for transmission through the serial channel.

6. The device as in claim 5, wherein the processor parses the request from the serial header and footer and generates the response with the serial header and footer for transmission over the serial channel to the adapter.

7. The device as in claim 6, wherein the adapter strips the serial header and footer from the response and builds a TCP/IP header and footer around the response for transmission over the network.

8. The device as in claim 1, wherein the electronic metering device is operative to perform a function selected from a group consisting of voltage transformation, regulation and control, power-factor, and load balancing, monitoring, and protection of hardware and a combination thereof.

9. An intelligent electronic metering device for communicating over a network via an open channel, the electronic metering device comprising:
   an adapter to couple the electronic metering device to an Ethernet network and to receive a message in TCP/IP protocol over the network, the message formatted in accordance with Distributed Network Protocol 3.0 (DNP 3.0), wherein the adapter strips a TCP/IP header and footer from the message without changing the message and formats the message with a serial header and footer in accordance with a protocol of the electronic metering device without changing the message, the TCP/IP protocol being different from the DNP 3.0;
   a serial channel coupled to the adapter and to transmit the message to a processor; and
   the processor to receive the message from the serial channel after the adapter formats the message with the serial header and footer, parse the message from the serial header and footer and generate a response with the serial header and footer for transmission over the serial channel to the adapter,
   wherein the adapter strips the serial header and footer from the response and formats a TCP/IP header and footer around the response without changing the response for transmission over the network.

10. A method for providing communications between at least one intelligent electronic metering device and a base device over a network, the method comprising the steps:
    transmitting a message from the base device, the message including data formatted with a header and footer of a network protocol of the network;
    receiving the message at the at least one intelligent electronic metering device and stripping the network protocol header and footer from the message without changing the message and reformatting the message in a communication protocol of the at least one intelligent electronic metering device without changing the message wherein the reformatting the message in a communication protocol includes building a serial header and footer around the message, the network protocol being different than the communication protocol;
    parsing a request from the message, the request formatted in at least one metering communication protocol;
    generating a response to the request in the communication protocol of the at least one intelligent electronic metering device;
    stripping the communication protocol of the at least one intelligent electronic metering device from the response and reformatting the response in the network protocol without changing the response; and
    transmitting the response over he network.

11. The method as in claim 10, wherein the network is an Ethernet medium.

12. The method as in claim 11, wherein the network protocol is TCP/IP.

13. The method as in claim 12, wherein the request and response are in accordance with the Distributed Network Protocol 3.0 (DNP 3.0).

14. An electrical energy metering system for monitoring and controlling at least one intelligent electronic metering device over a network, the system comprising:
    a base device coupled to the network that generates a message using a first communication protocol and transmits the message over the network in a second network protocol;
    the at least one intelligent electronic metering device including an adapter to couple the device to the network and to receive the message using the second network protocol, wherein the adapter formats the message using a third communication protocol by stripping a header and footer of the second network protocol from the message and building a header and footer of the third communication protocol around the message without changing the message, wherein the third communication protocol is a serial protocol of the at least one intelligent electronic metering device and is different than the second network protocol;
    a serial channel coupling the adapter to the processor for transmiting the message to the processor; and
    a processor to receive the message from the adapter, generate a response to the message and transit the response to the adapter via the serial protocol of the at least one metering device,
    wherein the adapter formats the response by building a header and footer of the second network protocol around the response without changing the response and transmits the response over the network via an open channel.

15. The system of claim 14, wherein the first protocol is Distributed Network Protocol 3.0 (DNP 3.0).

16. The system of claim 15, wherein the second network protocol is TCP/IP.

17. The system of claim 14, wherein the base device is selected from a group consisting of a remote terminal unit (RTU), a supervisory control and data acquisition (SCADA) master and a combination thereof.

18. The system of claim 17, wherein the network is an Ethernet medium.

* * * * *

UNITED STATES PATENT AND TRADEMARK OFFICE
CERTIFICATE OF CORRECTION

| | | |
|---|---|---|
| PATENT NO. | : 7,616,656 B2 | Page 1 of 1 |
| APPLICATION NO. | : 10/969592 | |
| DATED | : November 10, 2009 | |
| INVENTOR(S) | : Wei Wang et al. | |

It is certified that error appears in the above-identified patent and that said Letters Patent is hereby corrected as shown below:

On the Title Pg. Item (73) should read,

(73)   Assignee:   Electro Industries/Gauge Tech

Signed and Sealed this

Fifth Day of January, 2010

David J. Kappos
*Director of the United States Patent and Trademark Office*